United States Patent
Halliwell et al.

(10) Patent No.: US 11,047,539 B1
(45) Date of Patent: Jun. 29, 2021

(54) MULTI-OPERATIONAL LANDSCAPE LIGHTING DEVICE

(71) Applicant: FEIT ELECTRIC COMPANY, INC., Pico Rivera, CA (US)

(72) Inventors: Brian Halliwell, Chino Hills, CA (US); Gerardo Cisneros, Buena Park, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

(21) Appl. No.: 16/863,931

(22) Filed: Apr. 30, 2020

(51) Int. Cl.
| | |
|---|---|
| *F21S 9/03* | (2006.01) |
| *F21V 21/108* | (2006.01) |
| *F21V 23/00* | (2015.01) |
| *F21W 121/00* | (2006.01) |
| *F21Y 115/10* | (2016.01) |
| *F21W 131/109* | (2006.01) |

(52) U.S. Cl.
CPC ............ *F21S 9/037* (2013.01); *F21V 21/108* (2013.01); *F21V 23/005* (2013.01); *F21W 2121/00* (2013.01); *F21W 2131/109* (2013.01); *F21Y 2115/10* (2016.08)

(58) Field of Classification Search
CPC . F21S 9/037; F21S 8/088; F21S 8/036; F21V 21/116; F21V 23/005; F21V 21/108; F21V 21/0824; F21V 21/10; F21Y 2115/10; F21W 2121/10; F21W 2131/109; F21W 2111/023; F21W 2111/02; F21W 2121/00
See application file for complete search history.

(56) References Cited

U.S. PATENT DOCUMENTS

| | | | |
|---|---|---|---|
| 7,972,030 B2* | 7/2011 | Li | F21V 3/12 362/249.02 |
| 8,077,052 B2* | 12/2011 | Richmond | F21V 21/0824 340/815.4 |
| 9,157,591 B2* | 10/2015 | Rozot | F21S 2/005 |
| 9,752,754 B2* | 9/2017 | Trincia | F21V 7/0091 |
| D818,153 S | 5/2018 | Feit | |
| 10,274,188 B2* | 4/2019 | Sculler | F21V 33/0028 |
| 10,724,690 B2 | 7/2020 | Feit | |
| 2005/0207152 A1 | 9/2005 | Maxik | |

(Continued)

FOREIGN PATENT DOCUMENTS

| | | |
|---|---|---|
| CA | 3013021 A1 | 8/2019 |
| EP | 1843402 A1 | 10/2007 |

OTHER PUBLICATIONS

Wikipedia Contributors, "LED Filament", Wikipedia: The Free Encyclopedia, last edited on Jul. 13, 2020, 4 pages, retrieved from https://en.wikipedia.org/wiki/LED_filament on Aug. 7, 2020.

(Continued)

*Primary Examiner* — Peggy A Neils
(74) *Attorney, Agent, or Firm* — Alston & Bird LLP

(57) ABSTRACT

A multi-operational landscape lighting device is provided. An example multi-operational landscape lighting device includes a lighting device housing, a lighting device installation arm mechanically coupled to the lighting device housing, and a plurality of landscape lighting LED packages. The landscape lighting LED packages are configured to emit one or more of decorative lighting or pathway lighting.

24 Claims, 5 Drawing Sheets

(56) References Cited

U.S. PATENT DOCUMENTS

2008/0017870 A1    1/2008  Diamantidis
2013/0208454 A1*   8/2013  Chen ..................... F21S 9/037
                                                           362/183

OTHER PUBLICATIONS

Wikipedia Contributors, "Flexible Circuit", Wikipedia: The Free Encyclopedia, last edited on Mar. 11, 2020, 3 pages, retrieved from https://en.wikipedia.org/wiki/Flexible_circuit on Aug. 7, 2020.

* cited by examiner

MULTI-OPERATIONAL LANDSCAPE LIGHTING DEVICE

BACKGROUND

Light emitting devices may comprise light emitting diodes. Light emitting diodes (also referred to herein as LEDs) are semiconductor devices that emit light when an electric current is passed through them. The light is produced when particles that carry the electric current (i.e., electrons and holes) combine together with the semiconductor material of the semiconductor devices. LEDs are described as solid-state devices, which distinguishes them from other lighting technologies that use heated filaments or gas discharge as lighting sources (e.g., incandescent, tungsten halogen lamps; fluorescent lamps).

LEDs are widely used in lighting applications for residential and commercial structures. LEDs utilizing solar power are likewise widely used in lighting applications for residential and commercial structures. One such application is solar landscape lighting.

However, conventional solar landscape lights provide either a downlight effect for pathway lighting or an accent effect for decorative lighting. Deficiencies regarding but not limited to suitable materials, power supply, and control methods have imposed this limitation that conventional solar landscape lights can only provide either pathway lighting or decorative lighting, but not both. There is therefore a need for a solar landscape lighting device providing both pathway lighting and decorative lighting.

Through applied effort, ingenuity, and innovation many deficiencies of such systems have been solved by developing solutions that are in accordance with the embodiments of the present invention, many examples of which are described in detail herein.

SUMMARY

Providing a landscape lighting device having both a downlight effect and an accent effect is advantageous. Various embodiments are directed to an LED landscape lighting device. In embodiments, the landscape light device comprises a lighting device housing, the lighting device housing comprises a lighting device housing exterior, a lighting device bottom face, a lighting device top face, and a lighting device housing interior, wherein the lighting device housing interior comprises a void configured to house a plurality of landscape lighting LEDs therein. In embodiments, the landscape lighting device comprises a lighting device installation arm mechanically coupled to the lighting device housing. In embodiments of the landscape lighting device, a plurality of landscape lighting LED packages are disposed within the lighting device interior and are configured to emit one or more of pathway lighting or decorative lighting.

In embodiments, the lighting device installation arm further comprises means for making the device free standing, mounting to a wall, or for ground stake installation.

In embodiments, the lighting device housing comprises one or more of glass, acrylic, polycarbonate, an optically transparent material, or other material conducive to the transmission of light and solar energy.

In embodiments, the landscape lighting device is selectively operable in one of a plurality of landscape lighting device operation modes.

In embodiments, a landscape lighting device operation mode is one or more of pathway lighting or decorative lighting.

In embodiments, the lighting device housing comprises a lighting device housing frame and lighting device housing panes.

In embodiments, the lighting device bottom face defines a void configured to house a rechargeable battery therein.

The landscape lighting device of certain embodiments further comprises a rechargeable battery.

In embodiments, a first plurality of landscape lighting LED packages of the plurality of landscape lighting LED packages comprise landscape pathway lighting LEDs and a second plurality of landscape lighting LED packages of the plurality of landscape lighting LED packages comprise landscape decorative lighting LEDs.

In embodiments, a first plurality of landscape lighting LED packages of the plurality of landscape lighting LED packages are configured to emit pathway lighting and a second plurality of landscape lighting LED packages of the plurality of landscape lighting LED packages are configured to emit decorative lighting.

The rechargeable battery of certain embodiments is configured to receive, store and utilize solar power.

In embodiments, the landscape lighting device further comprises a circuit board comprising a first circuit board side and a second circuit board side. In embodiments, the plurality of landscape lighting LEDs is disposed on and/or are electrically and mechanically coupled with the first circuit board side. In embodiments, a plurality of leads/traces are disposed on and/or electrically and mechanically coupled with one or more of the first circuit board side or the second circuit board side and electrically coupled with the plurality of landscape lighting LEDs. In embodiments, driver circuitry is disposed on and/or electrically and mechanically coupled with one or more of the first circuit board side or the second circuit board side. The driver circuitry of embodiments is electrically coupled with the plurality of leads/traces of the circuit board.

In embodiments, the driver circuitry is configured to be driven by solar power.

The landscape lighting device of certain embodiments is further configured for collecting and storing solar power.

In embodiments, collecting and storing solar power occurs within the lighting device housing.

The landscape lighting device of certain embodiments is further configured for collecting and storing solar power at the lighting device bottom face.

In embodiments, the landscape light device comprises a lighting device housing. The lighting device housing of certain embodiments comprises a lighting device housing exterior, a lighting device bottom face, a lighting device top face, the lighting device top face comprising one or more solar panels, and a lighting device housing interior. The lighting device housing interior of certain embodiments comprises a void configured to house a first plurality of landscape lighting LED packages and a second plurality of landscape lighting LED packages therein. In embodiments, the landscape lighting device comprises a lighting device installation arm mechanically coupled to the lighting device housing. In embodiments of the landscape lighting device, a first plurality of landscape lighting LED packages and a second plurality of landscape lighting LED packages are disposed within the lighting device interior and are configured to emit light.

The landscape lighting device of certain embodiments is selectively operable in one of a plurality of landscape lighting device operating modes.

The lighting device bottom face of certain embodiments defines a void configured to house a rechargeable battery therein.

The landscape lighting device of certain embodiments further comprises a rechargeable battery.

The rechargeable battery of certain embodiments is configured to receive, store and utilize solar power.

The lighting device housing interior of certain embodiments is further configured for collecting and storing solar power.

In embodiments, the first plurality of landscape lighting LED packages comprise landscape pathway lighting LEDs and the second plurality of landscape lighting LED packages comprise landscape decorative lighting LEDs.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, and appended Claims signify the nature and advantages of the innovations, embodiments and/or examples of the claimed inventions. All the Figures signify innovations, embodiments, and/or examples of the claimed inventions for purposes of illustration only and do not limit the scope of the claimed inventions. Such Figures are not necessarily drawn to scale and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by a second or third label that distinguishes among the similar components (e.g., 1A and 1B may refer to components of the same type). If only the first reference label is used in the specification, the description is applicable to any one of the similar components having the same first reference label irrespective of the second reference label. A brief description of the Figures is below.

DETAILED DESCRIPTION

Figure 1:
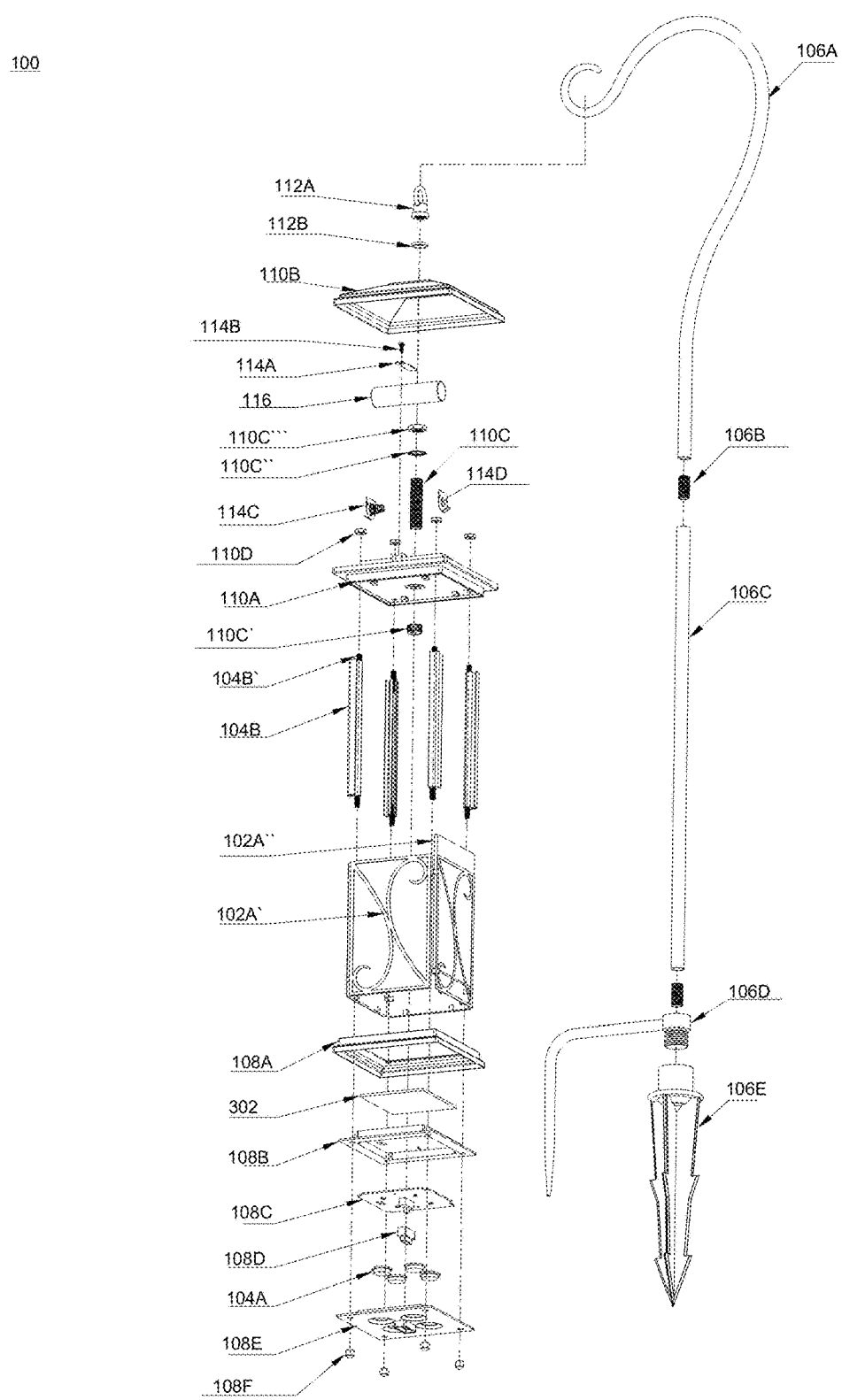
FIG. 1 is an exploded view of an exemplary landscape lighting device according to various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Embodiments of the present disclosure provide a landscape lighting device configured for dynamic functionality. That is, a landscape lighting device according to embodiments of the present disclosure is configured to provide both pathway lighting and decorative lighting. An example landscape lighting device according to embodiments of the present disclosure may be selectively operable to provide either pathway lighting or decorative lighting at any one time, in any particular operation session. An example landscape lighting device according to embodiments of the present disclosure may be configured for user selection of a plurality of dynamic LED functionalities.

Landscape lighting devices according to embodiments of the present disclosure employ a novel solar panel configuration. Embodiments of a landscape lighting device as described herein are therefore enabled to collect, store and utilize solar power to achieve both pathway lighting and decorative lighting.

Conventional solar landscape lights lack suitable configuration of the solar panel(s) to achieve the user functionality choices including both pathway lighting and decorative lighting as well as dynamic LED functionality. Conventional solar landscape lights configure solar panels at the top of the light fixtures. Consequently, conventional solar landscape lights would further require the use of a rechargeable battery, an accompanying compartment to house the rechargeable battery, and a control method to achieve both pathway lighting and decorative lighting. Such a configuration is not feasible in conventional designs, because a rechargeable battery would need to be housed at the top of the light fixture, thereby inhibiting light emission. Conventional solar landscape lights therefore suffer deficiencies regarding power supply, power consumption, and methods to control the same.

Landscape lighting devices according embodiments of the present disclosure overcome these deficiencies of conventional solar landscape lights by employing a novel configuration of a solar panel. In various embodiments of landscape lighting devices herein, a landscape lighting device may be configured such that solar energy is collected at the lighting device housing bottom face, within the lighting device housing interior. Landscape lighting devices of various embodiments may therefore employ a rechargeable battery(s) in electrical communication with the solar panels, enabling the configuration of a switch for selecting both pathway lighting and decorative lighting. The lighting device housing of various embodiments comprises material conducive for the collection and storage of solar power within the lighting device housing interior. For example, landscape lighting devices according to embodiments of the present disclosure may employ clear glass to allow sunlight into and through the lighting device housing interior to the bottom of the fixture. Absent the novel configuration of the solar panels as described herein, the use of a rechargeable battery is not possible. Hence, sufficient power to provide both pathway lighting and decorative lighting would not be possible.

Alternate embodiments of landscape lighting devices described herein may nonetheless be configured to collect and store solar power at the lighting device housing top face, while providing user functionality choices including either or both pathway lighting and decorative lighting as well as dynamic LED functionality. Landscape lighting devices according to alternate embodiments described herein thus employ solar panels both at the top of the lighting fixture and within its interior, as described above. Landscape lighting devices according to these alternate embodiments therefore overcome the deficiencies of conventional solar landscape lights that require that the solar panel(s) remain at the top of the fixture.

FIG. 1 is an exploded view of an exemplary landscape lighting device 100 according to various embodiments of the present disclosure. In an exemplary embodiment, a landscape lighting device 100 comprises a lighting device housing having a lighting device housing exterior, a lighting device housing interior (not shown), a lighting device housing bottom face 108, and a lighting device housing top face 110. The lighting device housing may comprise a single component, or as shown in FIG. 1, the lighting device housing may comprise a lighting device housing frame 102A' and lighting device housing panes 102A". The lighting device housing frame 102A' may define a substantially prismatic body profile, having two sets of opposing and conjoined lateral faces as shown. The lighting device housing frame 102A' may be formed such that each lateral face defines an ornate recess configured for housing the lighting device housing panes 102A" therein. The lighting device housing frame 102A' may comprise any suitable material (e.g., metal, plastic, wood, etc.). The lighting device housing panes 102A" may be interchangeable. For example, the lighting device housing panes 102A" may comprise one or more of glass, acrylic, polycarbonate, an optically transparent material, or other material conducive to the transmission of light and solar energy.

Alternatively, the lighting device housing panes 102A" may comprise a suitably translucent material such as frosted glass. As shown, the lighting device housing frame 102A' and lighting device housing panes 102A" may in combination define a profile that is substantially the outer surface a right square prism, being oriented along a longitudinal axis taken through the center of its square cross-section. The lighting device housing interior may thus define the void enclosed by the six faces of the right square prism. Alternatively, the lighting device housing may define a profile of any regular or irregular geometric shape suitable to configure an interior and exterior therefrom (e.g., cylinder, sphere, pentagon, etc.). The lighting device housing interior of embodiments is configured to house a plurality of landscape lighting LEDs 104A, 104B therein.

A lighting device bottom face may comprise a first bottom face portion 108A, which is substantially square shaped and defines a square shaped central recess configured to receive a planar portion therein. The first bottom face portion 108A may define a recessed ledge about its perimeter so as to be mechanically coupled to the lighting device housing 102. That is, the lighting device housing may sit atop the first bottom face portion 108A so as to engage the recessed ledge of the first bottom face portion 108A.

A lighting device bottom face may comprise a second bottom face portion 108B that is substantially square in cross section and has a raised planar portion on a dorsal surface. The raised planar portion may be configured to receive a solar panel 302A and to couple to the square shaped central recess of the first bottom face portion 108A. A ventral surface of the second bottom face portion 108B may define a square shaped recess configured to house a rechargeable battery therein. By thus configuring the square shaped recess of the second bottom face portion 108B as a rechargeable battery compartment, a lighting device mode switch 108C may be configured within the lighting device bottom face. The second bottom face portion 108B may comprise voids (e.g., bores) configured to receive four fastening means 108F (e.g., screw caps) at each of the four corners of a ventral surface.

A lighting device mode switch 108C may be substantially square in cross section and have a toggle switch extending radially from the center of a ventral surface. A toggle switch cover 108D may be configured in a suitable shape to encase the toggle switch of the lighting device mode switch 108C, and to enhance the user interface of the toggle switch. The lighting device mode switch 108C may be configured to couple with the second bottom face portion 108B. The lighting device mode switch 108C may be configured in electrical communication with the landscape lighting LEDs 104A, 104B, so as to initiate and change the operating mode of a landscape lighting device 100 according to embodiments of the present disclosure. Hence, by manipulation of the toggle switch of the lighting device mode switch 108C, a user may turn on/off a landscape lighting device 100, and initiate one or more of pathway lighting, decorative lighting or dynamic LED functionality. For example, a user may toggle the toggle switch of the landscape lighting device a first time in a first manner to turn on a landscape lighting device 100 from an off mode. A user may then toggle the toggle switch again in the first manner to initiate a first landscape lighting device operation mode. For example, a first landscape lighting device operation mode may be pathway lighting. A second landscape lighting device operation mode (e.g., decorative lighting or dynamic LED functionality) may be initiated by subsequent toggles of the toggle switch in the first manner. When a landscape lighting device is operated in a dynamic LED functionality mode, a user may toggle the toggle switch in a second manner to select between dynamic LED functionalities. For example, a first toggle of the toggle switch in a second manner may initiate a multi-color lighting effect. A second toggle of the toggle switch in a second predetermined manner may then initiate a solid white lighting effect. Subsequent toggling of the toggle switch in the second manner may thus cycle through dynamic LED functionalities. A final toggle of the toggle switch in the first manner may then return the landscape lighting device 100 to an off mode.

A lighting device bottom face may comprise a third bottom face portion 108E. The third bottom face portion 108E may be substantially square in cross section and have a toggle switch receptor that is a substantially rectangular void configured to receive the toggle switch of the lighting device mode switch 108C and the accompanying toggle switch cover 108D at the center of a ventral face. The third bottom face portion 108E may define four circular voids arranged in an equilateral perimeter about the toggle switch receptor that are configured to receive four landscape pathway lighting LEDs 104A. The third bottom face portion 108E may define four voids at its periphery that are configured to receive fastening means 108F so as to couple the third bottom face portion 108E to the second bottom face portion 108B. Thus configured, the second bottom face portion 108B and third bottom face portion 108E may simultaneously encase the lighting device mode switch 108C, the toggle switch cover 108D, and landscape pathway lighting LEDs 104A and couple, via fastening means 108F, to the landscape decorative lighting LEDs 104B.

A lighting device housing top face may comprise a first top face component 110A and a second top face component 110B that are mechanically coupled to one another. The first top face component 110A may be substantially square in cross section with recessed ledges configured to engage the second top face component contouring its perimeter and may define on a ventral surface a central void (e.g., a bore) configured to receive fastening means 110C (e.g., a bolt) for coupling to the second top face component 110B. The fastening means 110C may receive an endcap (e.g., a screwcap) 110C' at a proximate end for securing the first top face component 110A to the second top face component 110B. The fastening means 110C may receive, for example, a washer 110C" and nut 110C' at a distal end for securing the first top face component 110A to the second top face component 110B. The first top face component 110A may define on a ventral surface peripheral voids configured to receive the distal ends 104B' of the landscape decorative lighting LEDs 104B. Washers 110D may be configured to secure the distal ends 104B' of the landscape decorative lighting LEDs 104B to the first top face component 110A.

The second top face component 110B may define a substantially pyramidal profile, having a substantially square cross section. The second top face component 110B may define an inner void configured to house lighting device components therein, and have recesses configured to engage the recessed ledges of the first top face component 110A contouring an inner surface. The second top face component 110B may define a central void configured to receive the fastening means 110C in order to couple a lighting device installation loop 112A and installation loop washer 112B to the second top face component 110B. The lighting device installation loop 112A may comprise a substantially ring-shaped body configured to couple to the hook portion of the lighting device installation arm by inserting the hook portion of the lighting device installation arm through the ring of the lighting device installation loop 112A. A battery 116 may be housed within the inner void of the second top face component 110B. The battery 116 may be, for example, a dry cell such as Alkaline, Nickel oxyhydroxide, Zinc chloride or the like. Alternatively, the battery 116 may be a rechargeable battery such as NiCd, NiMH, Lead Acid, Li-ion, Li-ion polymer, Aluminum-ion, Magnesium-ion, or the like. The battery 116 may be of any suitable size, e.g., 4.5V, D, C, AA, AAA, AAAA, 9-volt, etc. The battery 116 may comprise, as illustrated in FIG. 1 for example, a cylindrical cell body, and be electrically couplable with a positive terminal 114C, and a negative terminal 114D. The cylindrical cell body of the battery 116 may define a longitudinal axis terminating in a first circular plane surface at a posterior end along the longitudinal axis and a second circular plane surface at an anterior end along the longitudinal axis. The positive terminal 114C may thus be disposed at or on the circular plane surface of the posterior end, and the negative terminal disposed at or on the circular plane surface of the anterior end. The positive terminal 114C and negative terminal 114D couplable with the battery 116 may be in electrical communication with the first and second plurality of landscape lighting LED packages to provide electrical power thereto. The battery 116 may be secured within the void of the second top face component 110B by securing means. For example, a rectangular brace 114A may straddle the battery 116 laterally. The rectangular brace 114A may define a void (e.g., a bore) at a first end that is configured to receive a securing means 114B (e.g., a screw). Thus, configured the rectangular brace 114A and securing means 114B may secure battery 116 in place.

In embodiments, the landscape lighting device 100 comprises a lighting device installation arm 106. The lighting device installation arm 106 of various embodiments is mechanically coupled to the lighting device housing 102. In various embodiments, the lighting device installation arm 106 is configured for coupling the lighting device installation arm 106 to an environment. For example, as shown in FIG. 1, the lighting device installation arm 106 may be substantially crook shaped and may comprise constituent installation arm elements. A lighting device installation arm 106 may comprise a first installation arm portion 106A. The first installation arm portion 106A may be substantially shaped as the crown of a shepherd's crook and define an inner void at a distal end configured to longitudinally receive a fastener 106B (e.g., a threaded bolt) therein.

A lighting device installation arm 106 may comprise a second installation arm portion 106C. The second installation arm portion 106C may be cylindrical in profile, defining inner voids at proximal and distal ends configured to longitudinally receive fasteners 106B therein. Thus, the first installation arm portion 106A may be mechanically coupled, via the fasteners 106B, to the second installation arm portion 106C.

A lighting device installation arm 106 may comprise a third installation arm portion 106D that is mechanically coupled to the second installation arm portion 106C. The third installation arm portion 106D may comprise a cylindrical portion having screw threads configured radially on a portion of its outer surface, and a hook-shaped projection extending radially from the unthreaded cylindrical portion. The unthreaded cylindrical portion of the third installation arm portion 106D may define an inner void such that the third installation arm portion 106D may be mechanically coupled, by a fastener 106B and via the inner void, to the second installation arm portion 106C.

A lighting device installation arm may comprise a fourth installation arm portion 106E. The fourth installation arm portion 106E may define a profile that is substantially arrow shaped, and have a cylindrical portion defining an inner void configured at a cranial end. The cylindrical portion of the fourth installation arm portion 106E may be configured to couple with the threaded outer surface of the cylindrical portion of the third installation arm portion 106D. Thus configured, a lighting device installation arm may act as a ground stake to couple a landscape lighting device 100 to an environment. However, the lighting device installation arm 106 may be any other suitable installation means for coupling a landscape lighting device 100 with an environment, including but not limited to tree mounts, flag pole mounts, wall mounts or the like.

In certain embodiments, the landscape lighting device 100 comprises a plurality of landscape lighting LEDs 104A, 104B disposed within the lighting device housing interior. Landscape pathway lighting LEDs 104A may be any suitable LED type configured for pathway lighting including fixed downlights, gimble downlights, can lights, pot lights or the like. Landscape decorative lighting LEDs 104B may be any suitable LED type configured to provide a decorative aesthetic, including pendants, string lights, fairy lights or the like. For example, as shown in FIG. 1, landscape decorative lighting LEDs 104B may be pendant lights. The landscape decorative lighting LEDs 104B may therefore be substantially rectangular-prismatic in shape and be configured at proximal and distal ends to mechanically couple 104B' to the lighting device housing bottom face and lighting device housing top face. For example, as shown, the landscape decorative lighting LEDs 104B may be configured with radially threaded proximal and distal ends so as to mechanically couple 104B' to the lighting device housing bottom face and lighting device housing top face. Landscape decorative lighting LEDs 104B may be configured in electrical communication with driver circuitry so as to mimic a variety of effects (e.g., a single color lighting effect, a multi-color lighting effect, a solid white lighting effect, a solid single color lighting effect, a solid multi-color lighting effect, a flame lighting effect, a flashing lighting effect, a twinkling lighting effect, a shimmering lighting effect, a chasing lighting effect, a sequencing lighting effect, or a color cycling lighting effect). For example, landscape decorative lighting LEDs 104B may configure an oscillator having a regular frequency to achieve a twinkling lighting effect. Or, for example, landscape decorative lighting LEDs 104B may be driven so that individual LEDs are turned on and off in a predetermined and repeating sequence thus creating a sequencing lighting effect. Thus, landscape decorative lighting LEDs 104B are configured for use in a plurality of dynamic functionalities.

Figure 2A:
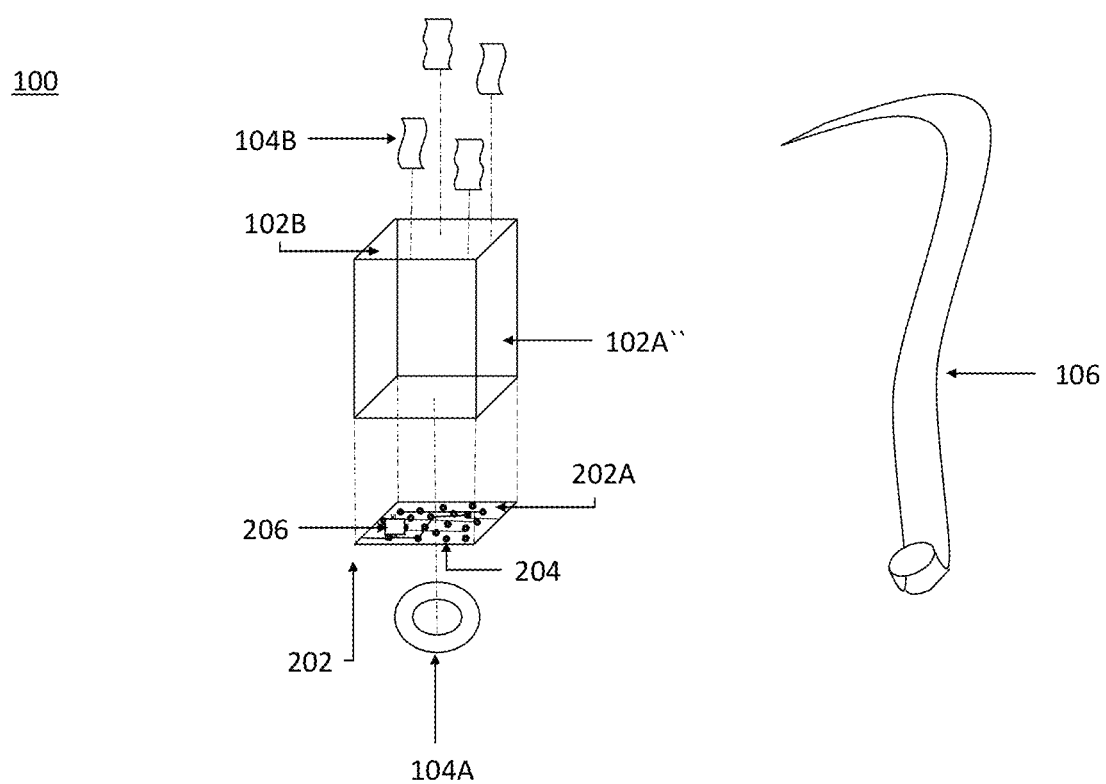
FIG. 2A is an exploded view of an exemplary landscape lighting device according to various embodiments.
Figure 2B:
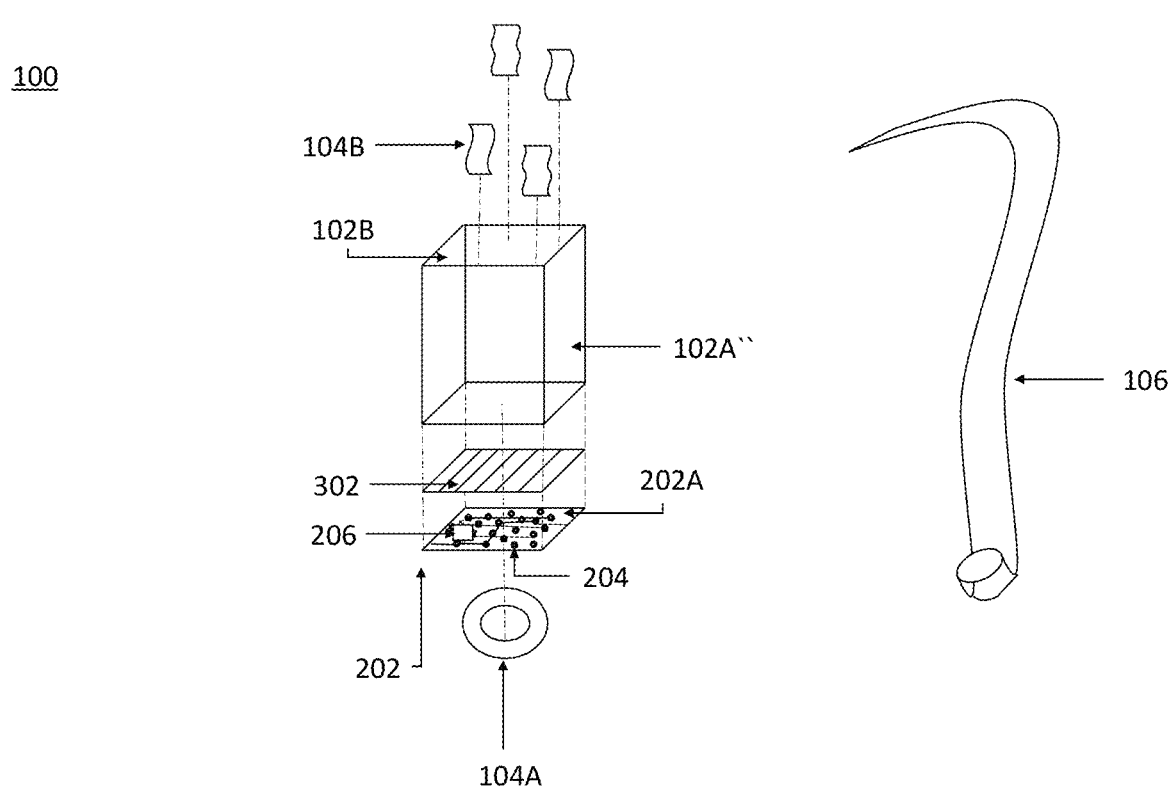
FIG. 2B is an exploded view of an exemplary landscape lighting device according to various embodiments.

FIGS. 2A-2B are exploded views of an exemplary landscape lighting device 100 according to various embodiments of the present disclosure. As shown in FIG. 2A, an exemplary landscape lighting device 100 may further comprise a circuit board 202. The circuit board 202 of various embodiments comprises a first circuit board side 202A and a second circuit board side (not shown). The plurality of landscape lighting LEDs 104A, 104B of various embodiments are disposed on and/or electrically and mechanically coupled with the first circuit board side 202A. The exemplary landscape lighting device 100 of various embodiments comprises a plurality of leads/traces 204 disposed on and/or electrically and mechanically coupled with one or more of the first circuit board side 202A or the second circuit board side (not shown) and electrically coupled with the plurality of landscape lighting LEDs 104A, 104B. As shown, the circuit board 202 of various embodiments may be disposed within the lighting device housing interior 102B. However, the circuit board 202 need not necessarily be in the geometric relationship to the landscape lighting LEDs 104A, 104B that is shown. Rather, the circuit board 202 may be configured in any feasible manner within the landscape lighting device 100 as is conducive for electrical communication between the circuit board 202 and landscape lighting LEDs 104A, 104B.

The exemplary landscape lighting device 100 of various embodiments comprises driver circuitry 206 disposed on and/or electrically and mechanically coupled with one or more of the first circuit board side 202A or the second circuit board side. The driver circuitry 206 of various embodiments may be electrically coupled with the plurality of leads/traces 204 of the circuit board 202. The driver circuitry 206 of an exemplary landscape lighting device 100 may be any suitable driver circuitry 206, including but not limited to, linear LED driver circuitry, linear regulator, specialized linear LED controller, switch mode LED driver circuitry and/or the like.

Driver circuitry 206 is configured to enable dynamic functionality (e.g., a single color lighting effect, a multi-color lighting effect, a solid white lighting effect, a solid single color lighting effect, a solid multi-color lighting effect, a flame lighting effect, a flashing lighting effect, a twinkling lighting effect, a shimmering lighting effect, a chasing lighting effect, a sequencing lighting effect, or a color cycling lighting effect). An appropriate driver circuitry 206 may be, for example, a 16-channel LED driver. Such an example driver circuitry 206 may be configured such that each channel is individually adjustable. For example, an example driver circuitry 206 may be configured with DOT correction and grayscale PWM control.

As shown in FIG. 2B, an exemplary landscape lighting device 100 may further comprise a solar panel 302A for collecting and storing solar power. Specifically, an exemplary landscape lighting device 100 is configured so that collecting and storing solar power occurs within the lighting device housing interior 102B. Thus, the solar panel(s) 302A of various embodiments may be disposed within the lighting device housing interior 102B. The solar panel(s) 302A may be configured in any feasible manner within the lighting device housing interior 102B as is conducive for electrical communication between the circuit board 202, solar panel(s) 302A and landscape lighting LEDs 104A, 104B.

The lighting device housing panes 102A" of various embodiments comprise glass, acrylic, polycarbonate, an optically transparent material, or other material conducive to the transmission of light and solar energy. This further facilitates collecting and storing of solar power occurring within the lighting device housing interior 102B. Collecting and storing of solar power within the lighting device housing interior 102B allows sufficient solar power to be stored for operating in simultaneous landscape lighting device operation modes.

The lighting device installation arm 106 of certain embodiments may comprise a single component, as shown in FIGS. 2A-2B. Alternatively, the lighting device installation arm 106 may comprise constituent lighting device installation arm components.

Figure 3A:
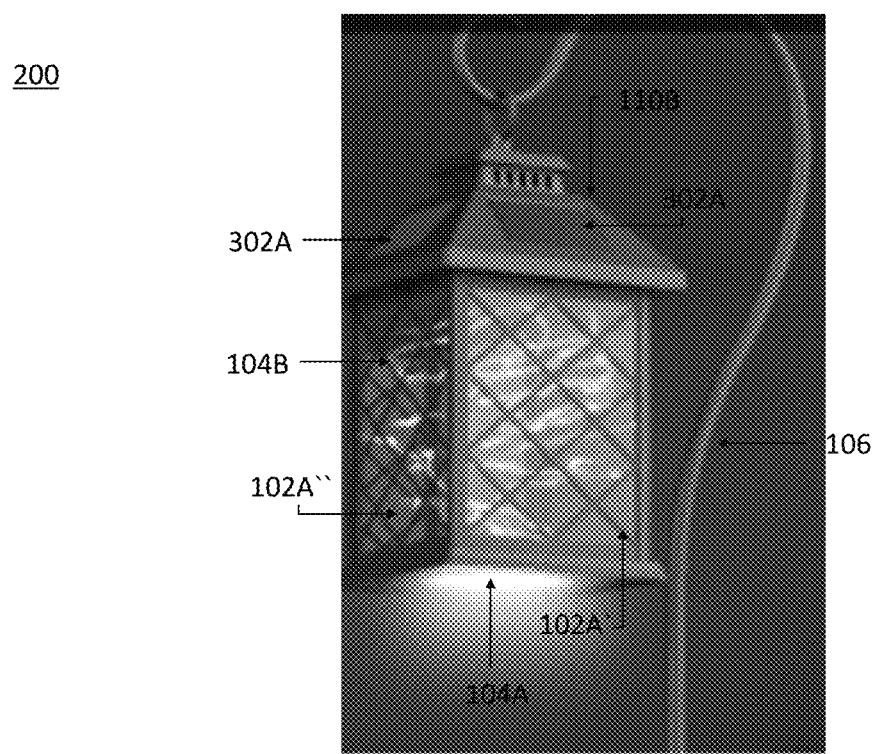
FIG. 3A is a perspective view of an exemplary landscape lighting device according to various embodiments.
Figure 3B:
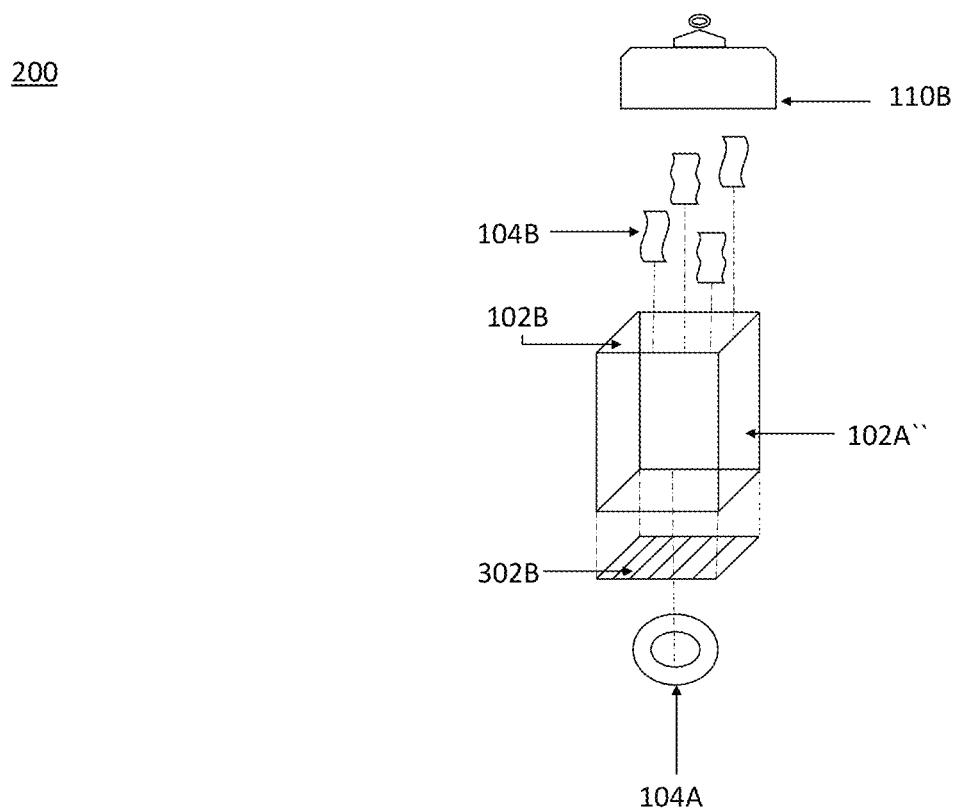
FIG. 3B is an exploded view of an exemplary landscape lighting device according to various embodiments.

FIG. 3A is a perspective view of an exemplary landscape lighting device 200 according to various embodiments of the present disclosure. FIG. 3B is an exploded view of an exemplary landscape lighting device 200 according to various embodiments. A landscape lighting device 200 may be configured such that collecting and storing solar power occurs either within the lighting device housing interior 102B, or at the second top face component 110B. For example, as shown in FIG. 3A, one or more solar panels 302A of various embodiments may define one or more exterior surfaces of the second top face component 110B. The one or more solar panels 302A defining one or more exterior surfaces of the second top face component 110B may thus accommodate users who require the solar panels to remain on the top of the fixture (or when the landscape lighting device comprises frosted or otherwise opaque glass surfaces such that sunlight may not efficiently reach the bottom of the device). Alternatively, one or more solar panels 302B may be housed within the lighting device housing interior 102B, as shown in FIG. 3B. In embodiments, the one or more solar panels 302B may be positioned near the bottom of the device when the device comprises clear or transparent glass surfaces such that sunlight may efficiently reach the solar panel at the bottom of the device.

It will be appreciated that, in some embodiments, solar panel 302A is configured at a top of the device while solar panel 302B is configured near a bottom of the device as described herein.

The one or more solar panels 302A, 302B may be in electrical communication with a rechargeable battery (not shown, however an example may be seen in FIG. 1). Such a configuration of the one or more solar panels 302A, 302B of an exemplary landscape lighting device 200 may therefore simultaneously provide sufficient power to operate both pathway lighting and decorative lighting while allowing an end user flexibility in form factor. For example, when storing and collecting solar power occur at the second top face component 110B, the lighting device housing panes 102A" of a landscape lighting device 200 may comprise translucent or less than transparent material, such as frosted glass. Thus configured, an exemplary lighting device 200 may provide an LED flame effect. The lighting device housing frame 102A' of various embodiments may comprise a suitable material (e.g., metal, plastic, wood, etc.) formed so as to define one or more ornate recesses configured for housing the lighting device housing panes 102A" therein. Alternatively, when storing and collecting solar power occur within the lighting device housing interior 102B, a user may circumvent the need to maintain the solar panels at the top of the fixture. In this case, the lighting device housing panes 102A" of a landscape lighting device 200 may comprise suitably transparent material such as glass, acrylic, polycarbonate or the like. The use of such optically transparent material is therefore conducive to ensure sufficient solar power is stored and harnessed to enable both pathway lighting and decorative lighting.

The landscape decorative lighting LEDs 104B of various embodiments may comprise string lights as shown, or any other suitable LED type configured to provide a decorative flame aesthetic, including pendants, fairy lights or the like. Landscape decorative lighting LEDs 104B of a landscape lighting device 200 are configured for dynamic LED functionality. For example, landscape decorative LEDs 104B may be configured to enable dynamic selection between a solid white lighting effect and a flame lighting effect. Thus, when enabled as a flame lighting effect, landscape decorative lighting LEDs 104B may be driven in a rising and falling pattern thereby imitating a flame aesthetic. Such a flame lighting effect may be employed to provide an appropriate ambiance. When enabled to produce a solid white lighting effect, landscape decorative lighting LEDs 104B may glow with a soft white color temperature. Landscape pathway lighting LEDs 104A may be any suitable LED type configured for pathway lighting including fixed downlights, gimble downlights, can lights, pot lights or the like.

The lighting device installation arm 106 of various embodiments may comprise a single component, as shown in FIG. 3B, or may comprise constituent lighting device installation arm components. Further, the lighting device installation arm 106 of various embodiments may comprise means for making the device free standing, mounting to a wall, or for ground stake installation.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A landscape lighting device, comprising:
    a lighting device housing, the lighting device housing comprising a lighting device housing exterior, a lighting device bottom face, a lighting device top face, and a lighting device housing interior, wherein the lighting device housing interior comprises a void configured to house a plurality of landscape lighting LED packages therein;
    a lighting device installation arm mechanically coupled to the lighting device housing;
    a plurality of landscape lighting LED packages disposed within the lighting device housing interior and configured to emit one or more of pathway lighting or decorative lighting; and
    a lighting device mode switch in electrical communication with the plurality of landscape lighting LED packages and actuatable in order to activate a pathway lighting operation mode of the landscape lighting device, a decorative lighting operation mode of the landscape lighting device, and a pathway and decorative lighting operation mode of the landscape lighting device.

2. The landscape lighting device of claim 1, wherein the lighting device installation arm further comprises means for making the landscape lighting device free standing, mountable to a wall, or installable using ground stakes.

3. The landscape lighting device of claim 1, wherein the lighting device housing comprises one or more of glass, acrylic, polycarbonate, an optically transparent material, or other material conducive to one or more of transmission of light or collection of solar energy.

4. The landscape lighting device of claim 1, wherein a first plurality of landscape lighting LED packages of the plurality of landscape lighting LED packages comprise landscape lighting pathway LEDs and a second plurality of landscape lighting LED packages of the plurality of landscape lighting LED packages comprise landscape lighting decorative LEDs.

5. The landscape lighting device of claim 1, wherein the lighting device housing comprises a lighting device housing frame and lighting device housing panes.

6. The landscape lighting device of claim 1, wherein the lighting device bottom face defines a void configured to house a rechargeable battery therein.

7. The landscape lighting device of claim 1, further comprising a rechargeable battery.

8. The landscape lighting device of claim 7, wherein the rechargeable battery is configured to receive, store and utilize solar power.

9. The landscape lighting device of claim 1, further comprising:
    a circuit board comprising a first circuit board side and a second circuit board side, wherein the plurality of landscape lighting LED packages is disposed on and/or are electrically and mechanically coupled with the first circuit board side;
    a plurality of leads/traces disposed on and/or electrically and mechanically coupled with one or more of the first circuit board side or the second circuit board side and electrically coupled with the plurality of landscape lighting LED packages; and
    driver circuitry disposed on and/or electrically and mechanically coupled with one or more of the first circuit board side or the second circuit board side, the driver circuitry electrically coupled with the plurality of leads/traces of the circuit board.

10. The landscape lighting device of claim 9, wherein the driver circuitry is configured to be driven by solar power.

11. The landscape lighting device of claim 10, further configured for collecting and storing solar power.

12. The landscape lighting device of claim 11, wherein collecting and storing solar power occurs via a solar panel disposed near the lighting device top face.

13. The landscape lighting device of claim 11, wherein collecting and storing solar power occurs via a solar panel disposed near the lighting device bottom face.

14. The landscape lighting device of claim 1, wherein a first plurality of landscape lighting LED packages of the plurality of landscape lighting LED packages are configured to emit pathway lighting and a second plurality of landscape lighting LED packages of the plurality of landscape lighting LED packages are configured to emit decorative lighting.

15. The landscape lighting device of claim 14, wherein the first plurality of landscape lighting LED packages is configured to emit pathway lighting simultaneously with the second plurality of landscape lighting LED packages emitting decorative lighting.

16. The landscape lighting device of claim 1, wherein the plurality of landscape lighting LED packages are configured for dynamic LED functionality.

17. The landscape lighting device of claim 16, wherein the dynamic LED functionality comprises one or more of a single color lighting effect, a multi-color lighting effect, a solid white lighting effect, a solid single color lighting effect, a solid multi-color lighting effect, a flame lighting effect, a flashing lighting effect, a twinkling lighting effect, a shimmering lighting effect, a chasing lighting effect, a sequencing lighting effect, or a color cycling lighting effect.

18. The landscape lighting device of claim 9, wherein the driver circuitry is configured to be responsive to one or more lighting device mode switch positions to enable the pathway lighting operation mode of the landscape lighting device, the decorative lighting operation mode of the landscape lighting device, and the pathway and decorative lighting operation mode of the landscape lighting device.

19. The landscape lighting device of claim 18, wherein the lighting device mode switch positions are selectable by way of a user actuatable toggle switch.

20. A method of manufacturing a landscape lighting device, the method comprising:
   mechanically coupling a lighting device installation arm to a lighting device housing, the lighting device housing comprising a lighting device housing exterior, a lighting device bottom face, a lighting device top face, and a lighting device housing interior, wherein the lighting device housing interior comprises a void configured to house a plurality of landscape lighting LED packages therein;
   configuring the plurality of landscape lighting LED packages to emit one or more of pathway lighting or decorative lighting; and
   electrically coupling a lighting device mode switch with the plurality of landscape lighting LED packages, the lighting device mode switch actuatable in order to activate a pathway lighting operation mode of the landscape lighting device, a decorative lighting operation mode of the landscape lighting device, and a pathway and decorative lighting operation mode of the landscape lighting device.

21. The method of claim 20, wherein a first plurality of landscape lighting LED packages of the plurality of landscape lighting LED packages is configured to emit pathway lighting and a second plurality of landscape lighting LED packages of the plurality of landscape lighting LED packages is configured to emit decorative lighting.

22. The method of claim 21, wherein the first plurality of landscape lighting LED packages is configured to emit pathway lighting simultaneously with the second plurality of landscape lighting LED packages emitting decorative lighting.

23. A landscape lighting device, comprising:
   a lighting device installation arm mechanically coupled to a lighting device housing;
   a plurality of landscape lighting LED packages disposed within the lighting device housing, wherein each landscape lighting LED package of the plurality of landscape lighting LED packages is configured to emit one or more of pathway lighting or decorative lighting; and
   a lighting device mode switch in electrical communication with the plurality of landscape lighting LED packages, the lighting device mode switch actuatable in a plurality of lighting device mode switch positions in order to activate a pathway lighting operation mode of the landscape lighting device, a decorative lighting operation mode of the landscape lighting device, and a pathway and decorative lighting operation mode of the landscape lighting device.

24. The landscape lighting device of claim 23, wherein a first plurality of landscape lighting LED packages is configured to emit pathway lighting simultaneously while a second plurality of landscape lighting LED packages emit decorative lighting.

* * * * *